United States Patent [19]

Sipovic et al.

[11] 3,771,832
[45] Nov. 13, 1973

[54] ADJUSTABLE TREAD WHEEL

[75] Inventors: Steve F. Sipovic; Herman A. Steinkraus, both of Mendota, Ill.

[73] Assignee: Motor Wheel Corporation, Lansing, Mich.

[22] Filed: Dec. 13, 1971

[21] Appl. No.: 207,368

[52] U.S. Cl. .................................. 301/9 TV, 301/20
[51] Int. Cl. ............................................ B60b 23/12
[58] Field of Search .................... 301/9 TV, 18, 19, 301/20

[56] References Cited
UNITED STATES PATENTS

| | | | |
|---|---|---|---|
| 2,840,418 | 6/1958 | Findley | 301/9 TV |
| 2,942,915 | 6/1960 | Kremkow | 301/9 TV |
| 3,348,884 | 10/1967 | Adams | 301/9 TV |
| 3,532,383 | 10/1970 | Unverferth | 301/9 TV |
| 2,162,696 | 6/1939 | Burger | 301/12 R |
| 2,779,629 | 1/1957 | Brink | 301/9 TV |

*Primary Examiner*—Richard J. Johnson
*Assistant Examiner*—Reinhard Eisenzopf
*Attorney*—Arthur Raisch et al.

[57] ABSTRACT

An axially adjustable tread wheel with an outer rim for mounting a tire having a plurality of circumferentially spaced axially extending driving members on the inner periphery and a central disc adapted to be connected in a plurality of axially spaced positions to the rim by circumferentially spaced rim clamps adapted to engage the driving members. The disc has a plurality of pockets with radially inclined parallel pairs of ramps adapted to urge the clamps radially outward into engagement with the driving members.

7 Claims, 9 Drawing Figures

INVENTORS
STEVE F. SIPOVIC
HERMAN A. STEINKRAUS
BY
Barnes, Kisselle, Raisch & Choate
ATTORNEYS

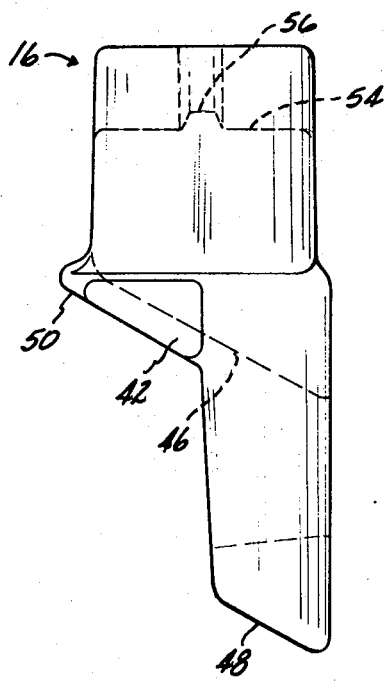
Fig-4
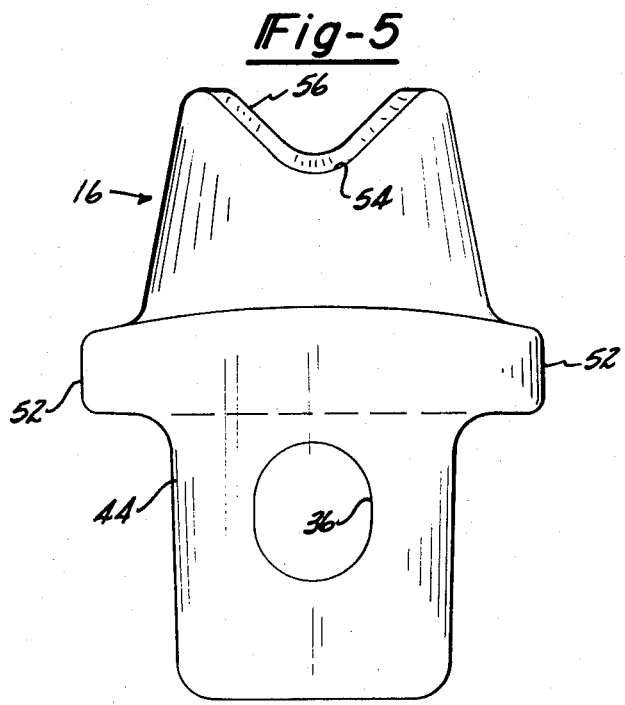
Fig-5
Fig-6
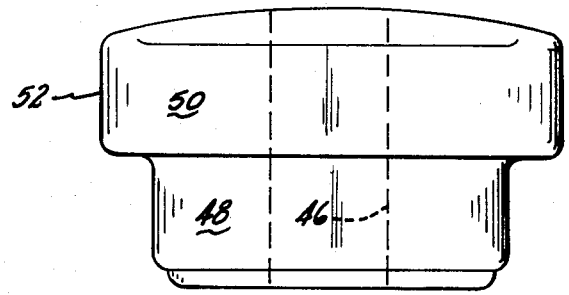
Fig-8
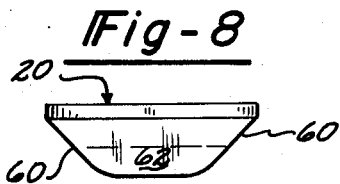
Fig-9
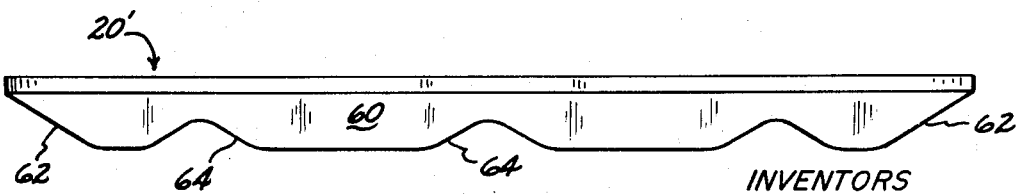
INVENTORS
STEVE F. SIPOVIC
HERMAN A. STEINKRAUS
BY
ATTORNEYS

ADJUSTABLE TREAD WHEEL

This invention relates to wheel assemblies, and more particularly to an axially adjustable tread wheel suitable for tractors and the like.

Objects of this invention are to provide an axially adjustable wheel of economical manufacture and assembly which can be readily adjusted and is relatively maintenance free.

These and other objects, features and advantages of this invention will be apparent from the following description, appended claims, and accompanying drawings in which:

FIGS. 4, 5 and 6 are side, front and bottom views respectively of a rim clamp of the wheel of FIG. 1.

FIGS. 8 and 9 are end and side views respectively of a driving member of the adjustable wheel of FIG. 7.

Figure 1:
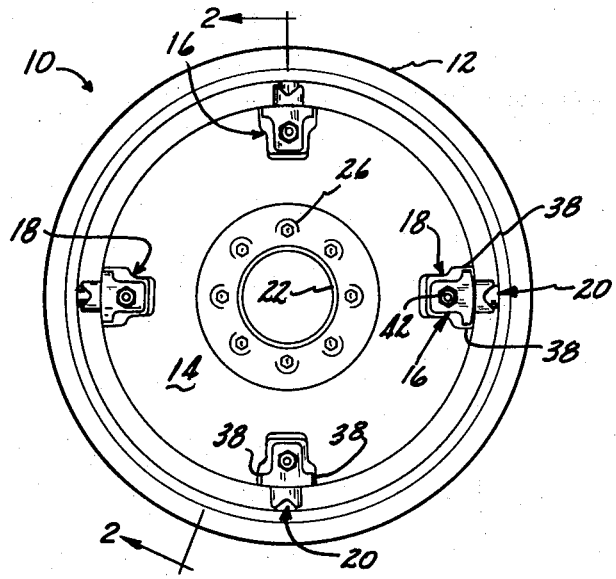
FIG. 1 is a side elevational view of an adjustable tread wheel embodying this invention.
Figure 2:
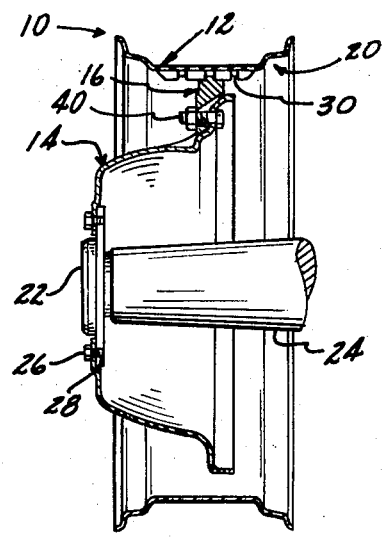
FIG. 2 is a vertical sectional view on line 2—2 of FIG. 1.
Figure 3:
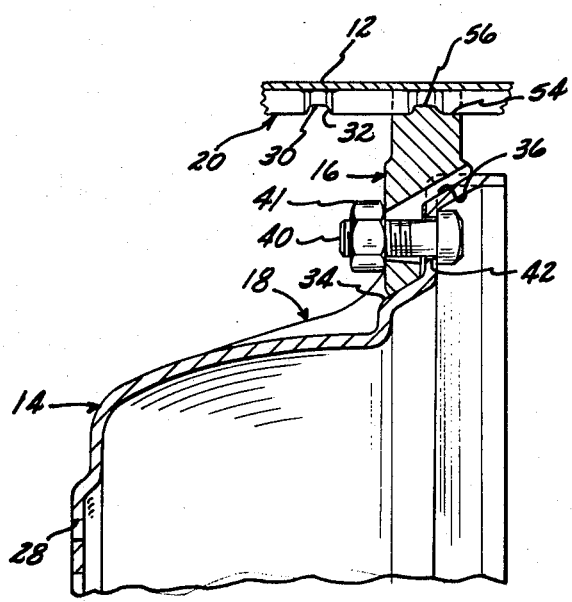
FIG. 3 is an enlarged fragmentary sectional view of a portion of FIG. 2.

Referring in more detail to the accompanying drawings, FIGS. 1, 2 and 3 illustrate an exemplary form of an adjustable tread wheel 10 constructed pursuant to the present invention, with an outer rim 12 for mounting a tire thereon and a central disc 14 connected to rim 12 by a plurality of rim clamps 16. Rim clamps 16 are received in pockets 18 of disc 14 and engage driving members 20 on rim 12. Disc 14 is connected to a mounting flange 22 of a tractor axle 24 by bolts 26 extending through a circle of bolt holes 28.

Wheel rim 12 and disc 14 are preferably made of rolled and/or stamped steel. Driving members 20 are circumferentially spaced about the inner periphery of rim 12 and are die formed from the material in the central well portion of rim 12 so as to be homogeneously integral therewith. Each driving member 20 is generally semi-circular in radial cross section taken perpendicular to the wheel axis and has a plurality of axially spaced recesses or grooves 30 with generally opposed axially spaced shoulders 32 receiving a projection of a rim clamp 16. Each rim clamp 16 is positioned in a pocket 18 of disc 14 by a pair of radially inclined parallel ramp surfaces 34 and 36 of the disc which are radially and axially spaced with respect to each other, and by a pair of opposed spaced abutments 38. Each clamp 16 is secured in a pocket 18 by a bolt 40 extending through a hole 42 in disc 14, a nut 41 being threadably received on bolt 40.

As shown in FIGS. 4, 5 and 6, each rim clamp 16 has a body 44 preferably of cast iron with a mounting hole 46 therethrough to receive bolt 40. Body 44 has a pair of parallel cam surfaces 48 and 50 which are spaced with respect to each other both radially and axially of the wheel axis, and which are inclined relative to the wheel axis at matching angle to ramp surfaces 34 and 36 respectively of a pocket 18 of the wheel disc. Clamp body 44 is stabilized on wheel disc 14 by opposed wing body 44 is stabilized on wheel disc 14 by opposed wing abutments 52 extending in close proximity to opposed abutments 38 of disc 14. The radially outermost end of clamp body 44 has a generally V-shaped groove 54 opening radially outward and extending axially of wheel 10 when the clamp is in mounted position thereon. Groove 54 is contoured for abutting and partially embracing engagement with the generally semi-circular under surface of the driving member 20. Body 44 also has a rib 56 extending transversely across the center of groove 54. Rib 56 has a generally inverted U-shape cross section contoured to be closely received in groove 30 and bear laterally against shoulders 32 of an associated driving element 20.

Figure 7:
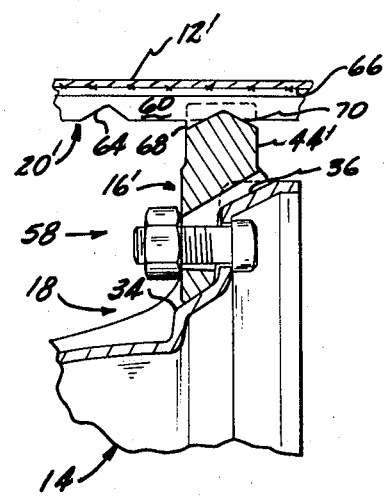
FIG. 7 is a fragmentary sectional view of a modification of the adjustable wheel of FIG. 1.

FIG. 7 shows an adjustable wheel 58 generally similar to wheel 10 with modified driving elements 20' and rim clamps 16'. As shown in FIGS. 8 and 9, each driving element 20' is made of a solid steel bar in the form of a truncated pyramid with sloping side walls 60 and end walls 62. Driving element 20 also has generally V-shaped transverse grooves 64 therein spaced axially of the wheel to provide three selectable positions to receive and engage clamp 16'. Driving elements 20' are fixed in circumferentially spaced relation to a steel circular rim 12' by some convenient means such as welds 66. The outer end of body 44' of each rim clamp 16' has a generally V-shaped axial groove 68 therein opening radially outwardly and contoured to engage the flat side walls 60 of driving element 20'. A rib 70 extending transversely across the center of groove 48 has a generally inverted V-shaped cross section contoured for abutting engagement in a groove 64 of a driving element 20'.

In both forms 10 and 58 of the adjustable wheel of this invention the dimensional relationship of the rim, disc and clamps of the wheel assembly to each other is such that the clamps will be cammed radially outwardly and urged into firm locking engagement with the associated drivers 20, 20' when the clamps 16, 16' are secured in pockets 18 of disc 14 by tightening the associated bolt 40 and nut 41. That is, as each bolt 40 is tightened, the associated clamp will be drawn toward and into firm engagement with disc 14, causing cam surfaces 48 and 50 of clamp body 34 to slide up ramp surfaces 34 and 36 of disc 14 to thereby cam the clamp body radially outwardly into firm engagement with the driving elements. As clamps 16, 16' move radially outwardly, their associated grooves 54, 68 are urged into firm abutment with the complementary sloping under surfaces of driving elements 20, 20' to thereby prevent disc 14 from rotating with respect to rim 12,12'. Such radial outward movement of clamps 16, 16' also causes their associated center ribs 56 and 70 to engage in grooves 30, 64 of driving bars 20, 20' to prevent disc 14 from shifting axially with respect to rim 12, 12'.

The wheels 10 and 58 are intended primarily to be mounted on the axle of a tractor, and when so mounted the axial position of the disc with respect to the rim and hence the width of the tread of the tractor can be adjusted without demounting the disc from the axle. This can be readily accomplished by jacking up the axle to take the load of the tractor off the rim and then loosening all of the rim clamps. This will lower the rim slightly, causing the rim clamp at the bottom or 6 o'clock position of the wheel assembly to become disengaged from its driving member. The rim is then shifted axially by pivoting it on the upper most rim clamp at the 12 o'clock position to allow the 6 o'clock clamp to be re-engaged in an adjacent groove in the associated driving member. The wheel then is rotated 90° to move the next loose clamp to the bottom or 6 o'clock position, and then the pivoting procedure is repeated to shift the next driving member axially until the proper groove is aligned with the associated loose clamp. The wheel is rotated in further increments and the procedure repeated until all of the driving members and hence the entire rim has been bodily shifted axially to the desired position. The rim clamps are then firmly resecured in their disc pockets by retightening the nuts and bolts to lock the rim in its new axially adjusted position so that it cannot shift circumferentially and axially with respect to the disc.

From the foregoing description it will now be apparent that the adjustable wheel embodying this invention provides a comparatively simple structure having a minimum number of parts which can be economically manufactured by casting and/or stamping processes, readily assembled, and easily adjusted with a few simple hand tools. The rim clamp and driving member arrangement provides a structure which positively locks the rim so that it cannot shift axially circumferentially or radially with respect to the disc, thereby eliminating the tendency of the disc to slip with respect to the rim even when large opposing torque forces are applied to the disc and rim.

From the foregoing description it will now be apparent to those skilled in the art that the construction of the integral driver 20 or the separately fabricated driver 20' may be further modified without departing from the principles of the present invention by a simple reversal of structure, i.e., wherein driver 20 or 20', in lieu of the grooves 30 with their shoulders 32 or the V-shaped grooves 64, have ribs extending radially inwardly from the rim 12 so as to protrude beyond the generally semi-circular adjacent surface of driver 20 or beyond the flat radially innermost surface of driver 20'. When the drivers are thus provided with inwardly protruding ribs instead of grooves, the ribs have their apexes extending perpendicular to the axis of rim 12, as do the vertices of the grooves 30 or 64. The associated clamps 16 or 16' likewise will be modified so that, in lieu of the transverse rib 56, a groove will be formed in the clamp, located like rib 56 centrally between the axially opposite ends of the major V-shaped grooves 54 or 68 of clamp 16 and 16' respectively. This transverse smaller groove will thus have its vertex extending perpendicular to the vertex of grooves 54 or 68, and will be of appropriate depth and shape to closely receive the aforementioned protruding transverse ribs of the associated driver 20 or 20'. This reversal of the grooves and ribs will thus still provide a plurality of a selected engagement positions of the clamp relative to the driver which when engaged as described previously, will lock the rim and disc of the wheel together to prevent relative axial motion therebetween.

It is also possible to further modify the invention to form the integral driver member 20 as an indentation in the radially inwardly facing surface of rim 12 so that the driver extends radially outwardly of the rim into the drop center well portion of the rim. Such an outwardly formed driver may likewise have the aforementioned transverse grooves or ribs adapted to mate with a clamp having complemental major and minor ribs oriented with their vertices at right angles to one another to engage the associated circumferential and axial mating locking structure of the driver. However, radially inwardly protruding drivers, such as the previously described driver members 20 or 20', are preferred over this further modification because the same are easier to form in the rim and are less susceptable to becoming clogged by dirt or mud which would have to be removed when making a tread width adjustment of the wheel.

We claim:

1. An adjustable tread wheel assembly comprising in combination a rim adapted to mount a tire thereon, a plurality of circumferentially spaced driving elements on said rim, each of said driving elements comprising a separate one-piece bar welded to the inner periphery of said rim and extending radially inwardly and axially thereof, each said bar having end walls and side walls sloping radially inwardly of the wheel toward convergence with one another and having a plurality of axially spaced recesses therein, a wheel disc having a plurality of circumferentially spaced pairs of radially inclined parallel ramp faces with the ramp faces of each pair being spaced radially and axially from each other, a clamp body associated with each pair of said ramp faces, said clamp body having a pair of parallel cam surfaces thereon spaced and inclined for complementary camming engagement with its associated pair of said ramp faces to slidably cam the clamp body radially outwardly with respect to said disc in response to relative axial movement of said body and disc, each of said clamp bodies being adapted to engage an associated one of said driving elements to restrain axial and circumferential relative movement of said clamp body and said rim in a plurality of axially spaced positions on said driving elements, each of said clamp bodies having a groove extending through its outboard end axially of said wheel and opening radially outwardly with a generally transversely extending projection in said groove, said groove being shaped to embrace an associated driving element and said projection being shaped to extend into any selected one of said recesses of said driving element to thereby restrain axial and circumferential movement of said clamp bodies with respect to said rim, and adjustable fastener means for urging said clamp body and said cam faces thereon axially into firm engagement with an associated pair of said ramp faces on said wheel disc to thereby cam said clamp body radially outwardly into circumferential, axial and radial locking engagement with an associated driving element whereby said rim is firmly securable for rotation with said disc of the adjustable tread wheel.

2. An adjustable tread wheel assembly comprising in combination a wheel disc having a plurality of circumferentially spaced clamp mounting means, a clamp body associated with each pair of said clamp mounting means, said clamp body having means cooperable with said clamp mounting means to urge said clamp body radially outwardly with respect to said disc, a rim adapted to mount a tire thereon, a plurality of circumferentially spaced driving elements on said rim, each of said driving elements comprising a rib extending radially inwardly of said rim from the adjacent surface thereof with an apex extending parallel to the axis of the wheel and adapted to engage and restrain an associated one of said clamp bodies from circumferential movement with respect to said rim, said rib having a plurality of recesses and protrusions alternating with one another in axially spaced relation along said rib apex and oriented with the respective vertices and apices thereof extending perpendicular to the axis of the wheel and adapted to engage and restrain the associated clamp body from axial movement with respect to said rim in a plurality of axially spaced positions on said driving element, each of said clamp bodies having first and second surfaces adapted to respectively engage said rib apex and a selected one of said rib recesses of an associated rib to restrain axial and circumferential relative movement of said clamp body and said rim, said clamp mounting means being adjustable for urging said clamp body radially outwardly into circumferential, axial and radial locking engagement with an associated rib whereby said rim is firmly securable for rotation with said disc of the adjustable tread wheel.

3. The wheel of claim 2 wherein each said driver element is imperforate.

4. The wheel of claim 3 wherein each of said driving elements is homogeneously integral with said rim.

5. The wheel of claim 3 in which said first surface of each of said clamp bodies comprises a groove extending through the outboard end of said body with its vertex extending axially of said wheel and opening radially outwardly, and wherein said second surface of each of said clamp bodies is defined by a projection extending generally transversely of said groove vertex, said body groove being shaped to embrace said rib apex of an associated driving element member and said body projection being shaped to extend into a selected one of said rib recesses adjacent an associated one of said rib protrusions to thereby restrain axial and circumferential movement of said clamp bodies with respect to said rim.

6. The wheel of claim 5 wherein each of said driving elements is homogeneously integral with said rim.

7. The wheel of claim 5 wherein said clamp mounting means comprises a plurality of circumferentially spaced pairs of radially inclined parallel ramp faces with the ramp faces of each pair being spaced radially and axially from each other, said clamp body means comprising a pair of parallel cam surfaces thereon spaced and inclined for complementary camming engagement with its associated pair of said ramp faces to slidably cam the clamp body radially outwardly with respect to said disc in response to relative axial movement of said body and disc, and adjustable fastener means for urging said clamp body and said cam faces thereon axially into firm engagement with an associated pair of said ramp faces on said wheel disc to thereby cam said clamp body radially outwardly into circumferential, axial and radial locking engagement with an associated driving element whereby said rim is firmly securable for rotation with said disc of the adjustable tread wheel.

* * * * *